US012591656B2

(12) United States Patent
Uglietti et al.

(10) Patent No.: US 12,591,656 B2
(45) **Date of Patent: *Mar. 31, 2026**

(54) METHOD FOR REGISTERING DIGITAL KEYS OF A VEHICLE IN A VIRTUAL WALLET, AND ASSOCIATED DEVICES

(71) Applicant: IDEMIA FRANCE, Courbevoie (FR)

(72) Inventors: Gianni Uglietti, Courbevoie (FR); Bruno Letellier, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 79 days.

This patent is subject to a terminal disclaimer.

(21) Appl. No.: 18/589,504

(22) Filed: Feb. 28, 2024

(65) Prior Publication Data

US 2024/0289431 A1     Aug. 29, 2024

(30) Foreign Application Priority Data

Feb. 28, 2023     (FR) ...................................... 23 01846

(51) Int. Cl.
| | |
|---|---|
| *G06F 21/00* | (2013.01) |
| *G06F 21/44* | (2013.01) |
| *G06F 21/60* | (2013.01) |

(52) U.S. Cl.
CPC ............ *G06F 21/44* (2013.01); *G06F 21/606* (2013.01)

(58) Field of Classification Search
CPC ... G06F 21/44; G06F 21/606; G07C 9/00309; G07C 9/00571; G07C 9/00857; H04W 12/50; H04W 12/47; H04W 12/069; H04W 4/40; H04W 12/068
See application file for complete search history.

(56) References Cited

U.S. PATENT DOCUMENTS

| | | | |
|---|---|---|---|
| 10,382,203 B1 * | 8/2019 | Loladia | ................... H04L 63/06 |
| 12,139,104 B2 * | 11/2024 | Lerch | ....................... G07C 9/23 |
| 2010/0241857 A1 | 9/2010 | Okude et al. | |
| 2011/0210830 A1 | 9/2011 | Talty et al. | |

(Continued)

FOREIGN PATENT DOCUMENTS

FR           3 075 536 A1      6/2019

OTHER PUBLICATIONS

Han, Jun, et al. "Short paper: MVSec: secure and easy-to-use pairing of mobile devices with vehicles." Proceedings of the 2014 ACM conference on Security and privacy in wireless & mobile networks. 2014. (Year: 2014).*

*Primary Examiner* — Ka Shan Choy
(74) *Attorney, Agent, or Firm* — Oblon, McClelland, Maier & Neustadt, L.L.P.

(57) ABSTRACT

The present invention relates to a method comprising the following steps:
  a system receives a first identifier and a second identifier transmitted by a user terminal, transmitted beforehand to the user terminal by the device via wireless communication requiring proximity between the user terminal and the device,
  the system checks for the existence of a match between two stored reference identifiers corresponding respectively to the first identifier and to the second identifier, provided that said match exists, the system transmits:
  a pairing password to the user terminal,
  a checker to a control unit of the vehicle, the checker being configured to authorize setup of a secure communication channel between the user terminal and the control unit of the vehicle.

10 Claims, 7 Drawing Sheets

(56) References Cited

U.S. PATENT DOCUMENTS

| 2014/0187149 A1 | 7/2014 | Lortz et al. | |
| 2015/0024688 A1 | 1/2015 | Hrabak et al. | |
| 2015/0339334 A1 | 11/2015 | Hanke | |
| 2017/0092030 A1* | 3/2017 | Badger, II | G07C 9/00571 |
| 2017/0171747 A1* | 6/2017 | Britt | H04W 12/0431 |
| 2020/0413242 A1* | 12/2020 | Yokoyama | B60R 25/24 |
| 2023/0393801 A1* | 12/2023 | Boule | B60K 35/80 |

* cited by examiner

METHOD FOR REGISTERING DIGITAL KEYS OF A VEHICLE IN A VIRTUAL WALLET, AND ASSOCIATED DEVICES

FIELD OF THE INVENTION

The invention relates to digital key services for vehicles, in particular for motor vehicles.

PRIOR ART

Vehicle manufacturers are launching digital key services (also known as phone-as-a-key services), in order to replace traditional keys with a terminal such as a mobile telephone. The terminal may thus be used for example to unlock a door of a vehicle or to start the engine of the vehicle.

However, current digital key services are not ergonomic.

Specifically, users experience difficulties in launching the procedure of pairing a vehicle with their mobile telephone and proving that they are indeed the owners of the vehicle in order to finalize the pairing of the two devices.

Manufacturers also provide a chip card comprising at least one contact-based and/or contactless communication interface as a back-up solution in order to be able to use the vehicle even when the terminal is not able to be used, for example when it is out of service or discharged.

However, current digital key services do not offer services related to the chip card. The user of a vehicle is therefore not able to carry out simple operations such as blocking the chip card or ordering a new one. Moreover, provision is also not made for multiple chip cards to be able to be used with the same vehicle. Thus, in the event of a problem with the card and the terminal, the user is no longer able to use their vehicle.

SUMMARY OF THE INVENTION

One aim of the invention is therefore to propose a new service to the user that makes it easier for them to pair their mobile telephone with the vehicle and to manage chip cards.

To this end, what is proposed is a pairing initialization method comprising the following steps:

a system receives a first identifier and a second identifier transmitted by a user terminal, the first identifier being specific to a vehicle and the second identifier being specific to a device, the first identifier and the second identifier having been transmitted beforehand to the user terminal by the device via wireless communication requiring proximity between the terminal and the device, the system checks for the existence, in a database, of a match between two reference identifiers stored in the database, corresponding respectively to the first identifier and to the second identifier, provided that said match exists in the database, the system transmits:

a pairing password to the user terminal, a checker to a control unit of the vehicle, the checker being configured to authorize setup of a secure communication channel between the terminal and the control unit of the vehicle provided that a candidate password transmitted by the user terminal to the control unit of the vehicle corresponds to said transmitted pairing password.

The procedure for pairing the vehicle with the terminal is thus simplified. Indeed, the user only needs to place the chip card close to their mobile telephone to start the pairing procedure and provide a password, sent by the system to their telephone, to prove that they are the owner of the vehicle in order to finalize the pairing.

In addition, the system serves as an interface between the user and the digital key services. Additional services related to the chip card, such as for example blocking the chip card, ordering a new chip card or even pairing multiple chip cards with the vehicle, may therefore be directly parameterized and centralized in the system so as to be easily accessible to the user by connecting to the system, in particular in the event of a problem with the chip card.

Provision may be made for the following steps:

the system receives the two reference identifiers, the two reference identifiers being transmitted by the control unit of the vehicle, the two reference identifiers are stored in the database after they have been received.

Provision may be made for the following steps:

the system receives a dissociation order for dissociation between the first identifier and the second identifier, the dissociation order being issued by the user terminal and comprising at least one of the first and the second identifier;

provided that a match exists in the database between at least one of the two reference identifiers stored in the database of the system and at least one of the first identifier and the second identifier contained in the dissociation order, the match is deleted from the database; and the system transmits a dissociation request to the control unit of the vehicle, said request being configured to inform the control unit of the vehicle that said match has been deleted from the database and to command the control unit of the vehicle to disassociate the device and/or the user terminal from the control unit of the vehicle, the control unit being configured, after receiving the disassociation request from the system, to not process commands emanating from the device and/or the user terminal.

Provision may furthermore be made for the following step:

the reference identifier corresponding to the first identifier is saved in a second database different from the database before the match is deleted from the database.

Provision may be made for the following steps:

the system receives an order for a second device distinct from the device;

the system transmits the order to a device provider.

Provision may be made in particular for the system to also transmit the first identifier specific to the vehicle to the device provider.

Provision may be made for the following steps:

a notification issued by the control unit of the vehicle is received, the notification informing the system about a request for pairing between a second device and the control unit of the vehicle, the second device being distinct from the device;

upon receipt of said notification, the system transmits an invitation to accept the pairing request to the user terminal;

the system receives a response to the invitation, the response indicating whether or not the pairing request is accepted; and the system transmits, to the control unit of the vehicle, authorization or refusal of the pairing request on the basis of said response.

Provision may be made for the transmission of the first identifier and of the second identifier to the user terminal to comprise:

near-field communication (NFC), or optical readout, by the user terminal, of a pattern representative of the first and the second identifier and displayed by the device, the pattern being for example a barcode or a QR code.

Provision may be made for the device to be a chip card.

According to the invention, provision is also made for a system comprising:

a communication interface configured to receive a first identifier and a second identifier transmitted by a user terminal, the first identifier being specific to a vehicle and the second identifier being specific to a device, the first identifier and the second identifier having been transmitted beforehand to the user terminal by the device via wireless communication requiring proximity between the terminal and the device, the system being configured to check for the existence, in a database, of a match between two reference identifiers stored in the database, corresponding respectively to the first identifier and to the second identifier; and a communication interface configured to transmit:

a pairing password to the user terminal, a checker to a control unit of the vehicle, provided that said match exists in the database, the checker being configured to authorize setup of a secure communication channel between the terminal and the control unit of the vehicle provided that a candidate password transmitted by the user terminal to the control unit of the vehicle corresponds to the transmitted pairing password.

According to the invention, provision is also made for a computer program product comprising first program code instructions for commanding the execution of the steps of the method according to the invention when the first code instructions are executed by a system; and optionally second program code instructions for commanding the execution of the steps of a second method when the second code instructions are executed by a user terminal, the second method comprising:

the user terminal receiving the first identifier and the second identifier transmitted by the device, the user terminal transmitting the received first identifier and second identifier to the system.

DESCRIPTION OF THE FIGURES

One embodiment of the invention will now be described by way of non-limiting example with reference to the drawings, in which.

DETAILED DESCRIPTION OF THE INVENTION

Devices

Figure 1:
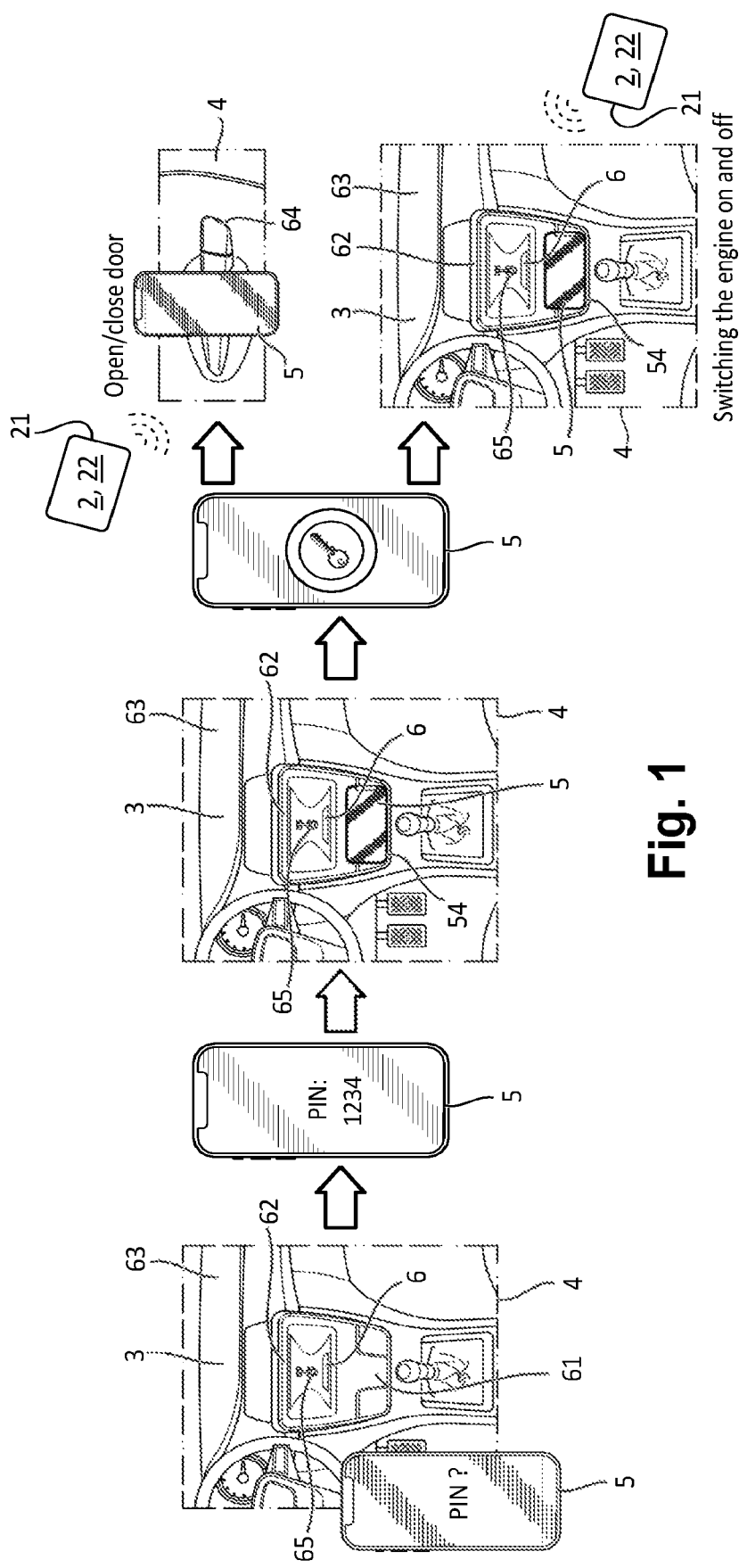
FIG. 1 schematically illustrates near-field communications between an internal reader of the vehicle and the user terminal.

With reference to FIG. 1, a vehicle 4 comprises an internal reader 6 and a control unit 3.

The internal reader 6 comprises:

a first communication interface 61 configured to exchange data, for example via near-field communication, for example NFC or Bluetooth communication, with a user terminal 5 and/or a device 2, 22; and a second communication interface 62 configured to transmit data to the control unit 3 of the vehicle 4.

A pushbutton 65 configured to command issuing of a dissociation order for dissociation between a first identifier relating to the vehicle 4 and a second identifier relating to the device 2, 22;

The first communication interface 61 may for example be located in the passenger compartment 63 of the vehicle, or else in the door 64, or both.

Figure 2:
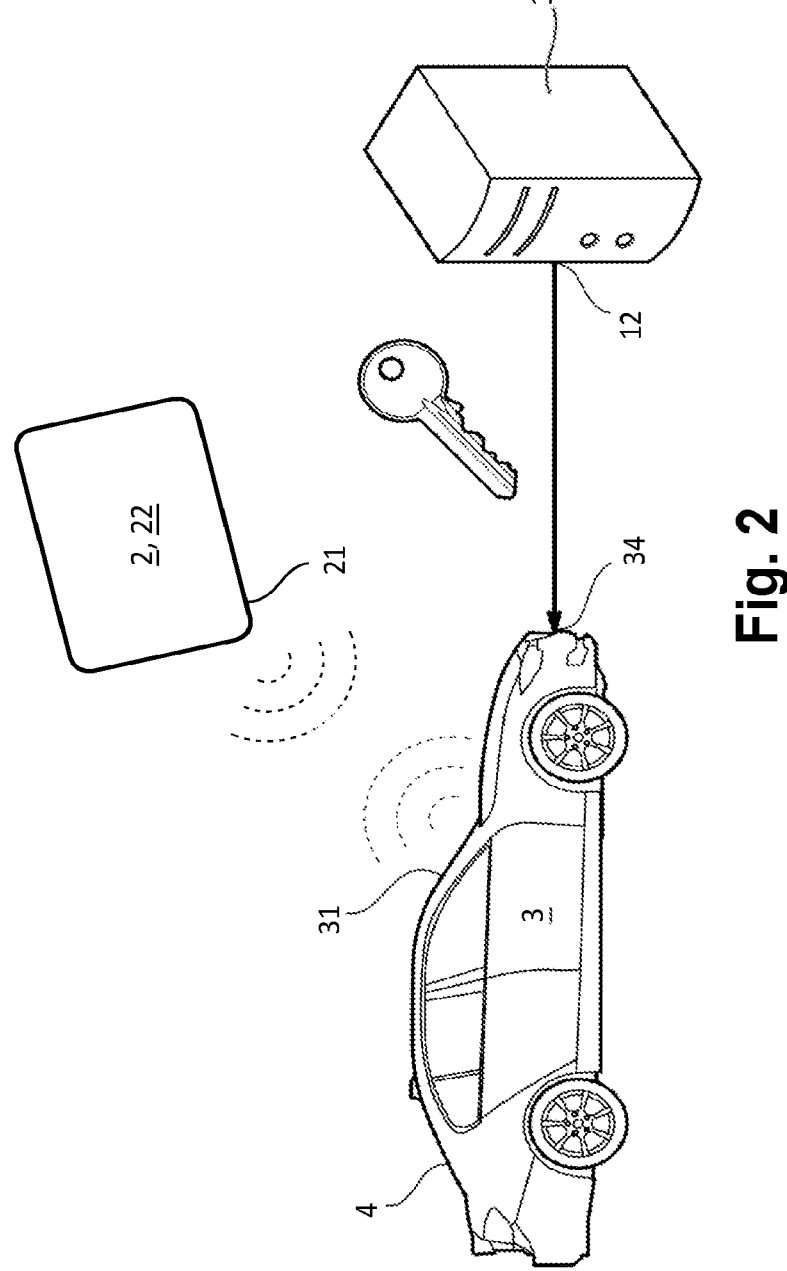
FIG. 2 illustrates a map of the exchanges between a system, a device and a control unit of the vehicle before the vehicle is first started.
Figure 3:
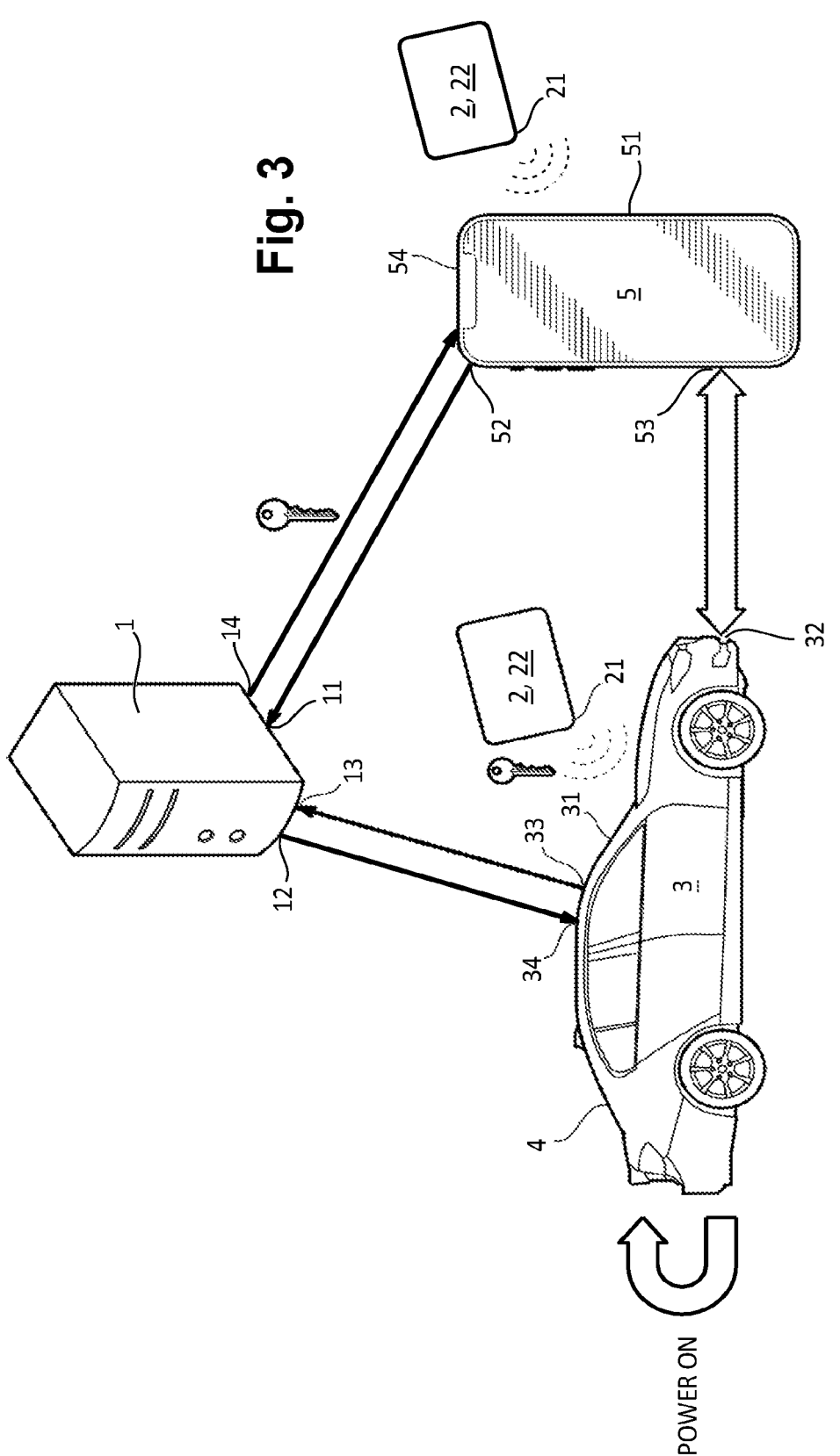
FIG. 3 illustrates a map of the exchanges between the system, the device, the control unit of the vehicle and the user terminal after the vehicle is first started.

With reference to FIGS. 2 and 3, the control unit 3 comprises:

a first communication interface 31;

a second communication interface 32; and a first memory (not shown in the figures).

The first and the second interface 31, 32 are configured to act as poller and/or listener in a near-field communication mode, for example NFC or Bluetooth communication mode, with a device 2 and a user terminal 5, respectively. Provision is also made for the first communication interface 31 to be configured as a poller and/or listener in a near-field communication mode, for example NFC or Bluetooth communication mode, with a second device 22 or multiple devices.

With regard to parameterizing and dimensioning the first communication interface 31 and second communication interface 32, those skilled in the art may refer to the following documents: *NFC Analog Technical Specification 2.1—NFC Forum and NFC Digital Protocol Technical Specification* 2.1; and to the document *Digital Key Release* 3, *Technical Specification* 1.1.0—*Car Connectivity Consortium.*

For example, when acting as listener, the first interface 31 is configured to receive, from the device 2, a specific identifier of the device 2. When acting as poller, the first interface 31 is configured to transmit, to the device 2, an identifier specific to the vehicle 4.

Furthermore, the second communication interface 32 is configured to set up a secure communication channel between the control unit 3 of the vehicle 4 and the user terminal 5. Setup of the secure channel may for example follow a SPAKE2+ security protocol employing the first secret transmitted to the control unit 3 of the vehicle 4, for example a password checker (or checker in the rest of the document) configured to authorize setup of the secure channel between the terminal 5 and the control unit 3 of the vehicle 4 provided that a candidate password transmitted by the user terminal 5 to the control unit 3 of the vehicle 4 matches a second secret, for example a pairing password, transmitted beforehand to the user terminal 5 by a system 1.

Those skilled in the art may refer to the following documents: *Network Working Group Internet Draft: SPAKE2+, an Augmented SPAKE,* draft-bar-cfrg-spake2plus-00, Mar. 9, 2020, and *Digital Key Release* 3,

*Technical Specification* 1.1.0—*Car Connectivity Consortium* with regard to parameterizing the setup of the secure communication channel.

The control unit 3 may furthermore comprise a third communication interface 33 configured to transmit the identifier specific to the vehicle 4 and the identifier specific to the device 2 to the system 1, or to transmit identifiers specific to multiple devices.

The control unit 3 may also comprise a fourth communication interface 34 configured to receive the first secret transmitted by the system 1. The memory of the control unit 3 is configured to store data, for example the first secret. In particular, the memory is configured to store the password checker transmitted by the system 1. In addition, the memory is configured to store the identifier specific to the vehicle 4 and the identifier specific to the device 2. Provision is also made for the memory of the control unit 3 to be configured to store a second password checker transmitted by the system 1 or a plurality of password checkers of a plurality of devices, transmitted by the system 1. Provision is also made for the memory of the control unit 3 to be configured to store the second identifier specific to the second device 22 or multiple identifiers specific to each device of a plurality of devices.

The control unit 3 of the vehicle 4 is furthermore configured to not process requests transmitted by the user terminal 5, for example when the user terminal 5 is close to the internal reader 6 in the door 64 or in the passenger compartment 63, and by a device 2, 22. In the present case, the control unit 3 of the vehicle 4 deletes the specific identifier of the device 2, 22 so that said device 2, 22 is no longer able to be recognized by said control unit 3 of the vehicle 4, and the control unit 3 of the vehicle 4 deletes the first secret and deactivates the secure communication channel between said control unit 3 of the vehicle 4 and the user terminal 5.

The device 2 and the second device 22 may be chip cards comprising at least:

a second memory (not shown in the figures); and
a communication interface 21.

The communication interface 21 of the devices 2, 22 comprises an NFC module and an antenna coil. The antenna coil has one or more coplanar coaxial windings parallel to the plane of the chip card, and therefore has a magnetic axis perpendicular to the plane of the chip card. The communication interface 21 of the devices 2, 22 (chip card) is configured to carry out NFC communication (contactless near-field communication) with an external NFC terminal, for example the user terminal 5 (for example a smartphone) via the antenna coil. When the chip card (the devices 2, 22) and the external NFC terminal (user terminal 5) are placed close enough to one another, the antenna coil of the chip card is inductively coupled to an antenna coil of the external NFC terminal (user terminal 5), and data are able to be exchanged using conventional NFC techniques such as those defined by the ISO 14443 and ISO 15693 standards. To this end, the antenna coil of the chip card is associated with passive components (for example capacitors) so as to form an antenna circuit tuned to an operating frequency of the external NFC terminal (user terminal 5), for example 13.56 MHz.

According to other embodiments, the communication interface 21 may comprise one of the following elements:

a Bluetooth module;
an electronic module configured to exchange data with the external NFC terminal, the user terminal 5 for example, when there is contact between the external terminal and the communication interface 21 according to the ISO7816-2:2017 standard of October 2017 or the ISO7810:2019 standard of December 2019;
a pattern, for example a barcode or a QR (Quick Response) code, displayed by the device 2, 22.

The communication interface 21 of the devices 2, 22 is furthermore configured to receive identifiers, for example the first identifier, from the control unit 3 of the vehicle 4 and/or the internal reader 6, and to transmit identifiers, for example the second identifier, to the control unit 3 of the vehicle 4 and/or to the internal reader 6. The first identifier and the second identifier may be the identifier specific to the vehicle 4 and the identifier specific to the device 2, respectively.

According to one embodiment, the communication interface 21 of the devices 2, 22 is configured to transmit identifiers, for example the first identifier and the second identifier, to the user terminal 5 via near-field communication. The first identifier is specific to the vehicle 4 and the second identifier is specific to the device 2.

According to another embodiment, the communication interface 21 of the devices 2, 22 is configured to transmit identifiers, for example the first identifier and the second identifier, to the user terminal 5 via optical readout, by the terminal 5, of a pattern representative of the first identifier and the second identifier and displayed by the device 2, the pattern being for example a barcode or a QR code.

The memory is configured to store the first identifier and the second identifier.

The user terminal 5 comprises at least:

a third memory (not shown);
a first communication interface 51;
a second communication interface 52;
a third communication interface 53; and
a fourth communication interface 54.

The user terminal 5 may be a mobile terminal, for example a smartphone, or else a fixed terminal, for example a computer.

According to one embodiment, the communication interface 51 of the user terminal 5 is configured to receive the first identifier and the second identifier transmitted by the device 2 via near-field communication, for example NFC or Bluetooth communication. The first identifier is specific to the vehicle 4 and the second identifier is specific to the device 2.

According to another embodiment, the communication interface 51 of the terminal 5 is configured to receive the first identifier and the second identifier transmitted by the device 2 via optical readout, by the user terminal 5, of a pattern representative of the first identifier and the second identifier and displayed by the device 2, the pattern being for example a barcode or a QR code.

Provision is also made for the communication interface 51 of the user terminal 5 to be configured to receive identifiers transmitted by a second device 22 or by each device of a plurality of devices.

The second communication interface 52 of the user terminal 5 is configured to exchange data with the system 1.

The third communication interface 53 of the user terminal 5 is configured to exchange data with the control unit 3 of the vehicle 4. For example, the third communication interface 53 of the user terminal 5 is configured to transmit the second secret to the control unit of the vehicle.

The fourth communication interface 54 of the user terminal 5 is configured to transmit data to the internal reader 6, for example the second secret.

The memory of the user terminal 5 is configured to store data, for example the second secret. In particular, the memory is configured to store the pairing password transmitted by the system 1. In addition, the memory is configured to store the first identifier and the second identifier. Provision is also made for the memory to store a plurality of identifiers.

The user terminal 5 may comprise a computer program product, for example an application for a mobile telephone, comprising code instructions executed by a processor of the user terminal 5 configured to command the communication interfaces 51, 52, 53, 54 of the user terminal 5 and the third memory of the user terminal 5.

The first secret and the second secret, for example the password checker and the pairing password respectively, are transmitted by the system 1, which comprises:

a database (not shown) configured to initially record a reference identifier specific to the vehicle 4, the first and second secrets associated with the reference identifier specific to the vehicle 4, and then the identifier specific to the vehicle 4 and the identifier specific to the device 2 transmitted by the control unit 3 of the vehicle 4; and a server (not shown) comprising:

a communication interface 11 configured to receive the first identifier and the second identifier transmitted by the user terminal 5;

a second communication interface 12 configured to transmit the first secret to the control unit 3 of the vehicle 4; and a third communication interface 13 configured to receive the identifier specific to the vehicle 4 and the identifier specific to the device 2 transmitted by the control unit 3 of the vehicle 4.

The database may furthermore be configured to record a plurality of secrets. It may also be configured to record the identifier specific to a second device 22 or multiple identifiers specific to each device of a plurality of devices.

The communication interface 11 may furthermore be configured to receive multiple identifiers transmitted by the user terminal 5. For example, the identifier specific to the second device 22 or multiple identifiers specific to each device of a plurality of devices.

The server may also be configured to check whether a match exists, in the database, between identifiers transmitted by the control unit 3 of the vehicle 4 and stored in the database and identifiers transmitted by the user terminal 5 to the server of the system 1 and received beforehand by the user terminal 5 from the device 2.

In the present case, the server furthermore comprises a fourth communication interface 14 configured to transmit the second secret to the user terminal 5 provided that a match exists, in the database, between the two identifiers transmitted by the control unit 3 of the vehicle 4 and stored in the database and, respectively, the identifiers transmitted by the user terminal 5 to the server of the system 1 and received beforehand by the user terminal 5 from the device 2.

The second communication interface 12 may furthermore be configured to transmit the first secret to the control unit 3 of the vehicle 4 provided that a match exists, in the database, between the two identifiers transmitted by the control unit 3 of the vehicle 4 and stored in the database and, respectively, the identifiers transmitted by the user terminal 5 to the server of the system 1 and received beforehand by the user terminal 5 from the device 2.

The server may also be configured to delete a match between at least one of the two reference identifiers stored in the database of the system 1 and at least one of the received first identifier and second identifier through a dissociation order, provided that a match exists, in the database, between at least one of the two reference identifiers stored in the database of the system 1 and at least one of the first identifier and the second identifier contained in the dissociation order.

In the present case, the server furthermore comprises a second database configured to record the reference identifier before the match is deleted.

The fourth communication interface 14 is furthermore configured to transmit an error message to the user terminal 5 in the event that the match does not exist in the database.

For example, the error message may invite the user to contact a technical support team for the vehicle 4 or the device 2.

The communication interface 11 is furthermore configured to receive a dissociation order for dissociation between the first identifier and the second identifier, the dissociation order being issued by the user terminal 5.

The second communication interface 12 is configured to transmit a dissociation request to the control unit 3 of the vehicle 4, comprising:

information, intended for the control unit 3 of the vehicle 4, notifying that said match has been deleted from the database; and a command from the control unit 3 of the vehicle 4 to dissociate the device 2, 22 and/or the user terminal 5 from the control unit of the vehicle 4.

For example, the command may comprise code instructions that, when they are executed by the control unit 3 of the vehicle 4, implement deletion of the specific identifier of the device 2 and/or the identifier specific to a second device 22 and/or multiple identifiers specific to each device of a plurality of devices and of the first secret and implement deactivation of the secure communication channel between said control unit 3 of the vehicle 4 and the user terminal 5.

According to another embodiment, the dissociation request is issued via a pushbutton 65 of the internal reader 6.

The system 1 may furthermore comprise multiple interconnected servers.

The second secret may be a pairing password able to be recognized by the password checker.

Methods

Figure 4:
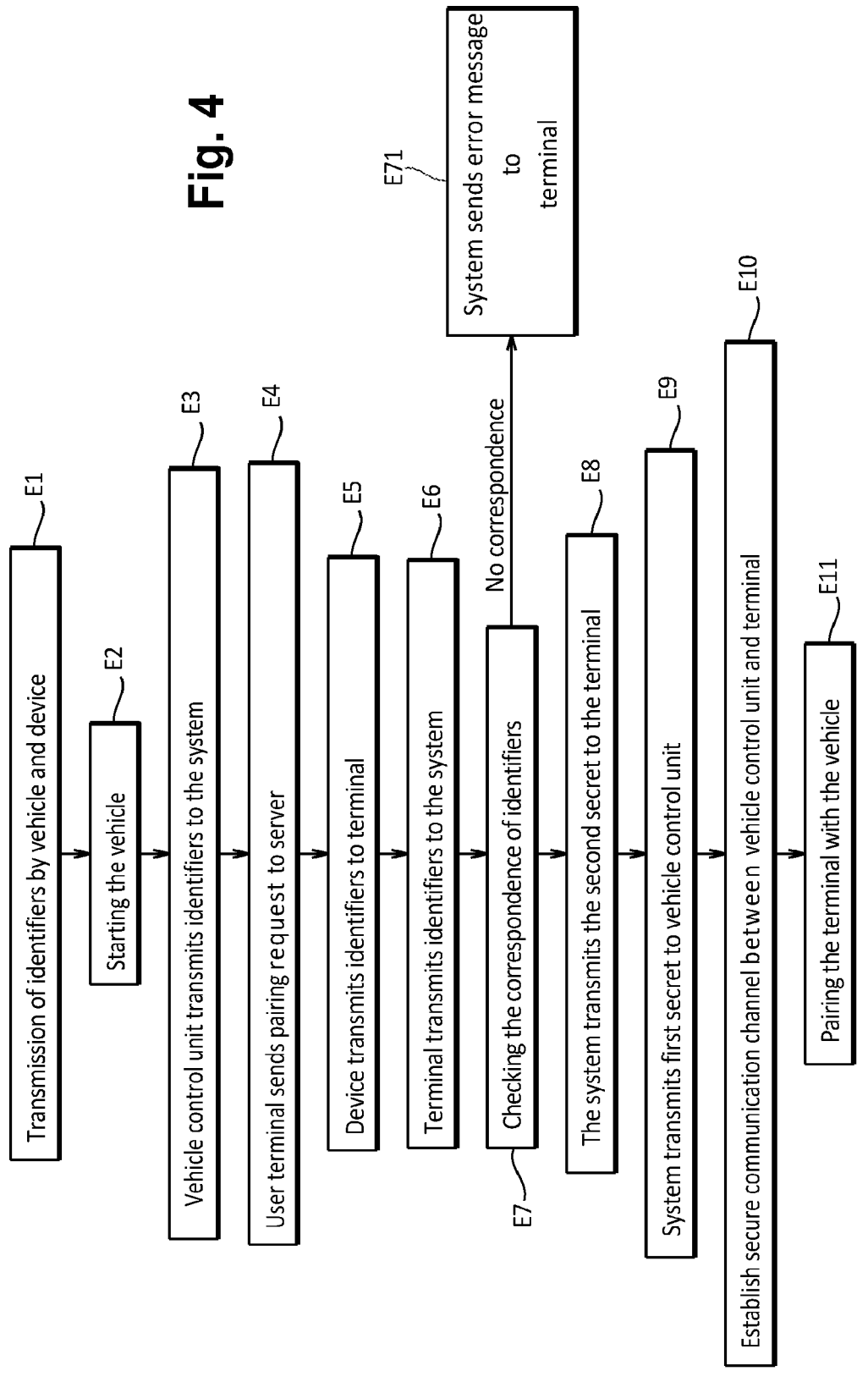
FIG. 4 is a flowchart of one mode of implementation of the method according to the invention.

With reference to FIG. 4, a method implemented jointly by the system 1, the control unit 3 of the vehicle 4, the device 2 and the user terminal 5 comprises the following steps.

In a step E1, the device 2 transmits the identifier specific to the device 2 to the control unit 3 of the vehicle 4 and the control unit 3 of the vehicle 4 transmits the identifier specific to the vehicle 4 to the device 2.

In a step E2, the vehicle 4 is started for the first time.

In a step E3, the system 1 receives the identifier specific to the device 2 and the identifier specific to the vehicle 4 transmitted by the control unit 3 of the vehicle 4.

In a step E4, a user of the vehicle 4 uses the user terminal 5 to transmit a request to the system 1 in order to initiate an attempt to pair the user terminal 5 with the vehicle 4, for example via the application of the vehicle manufacturer of the vehicle 4.

At this stage, the user terminal 5 asks the user to place the device 2 close to the user terminal 5, for example by notifying them via the application through a message.

In a step E5, the device 2 transmits the identifier specific to the device 2 and the identifier specific to the vehicle 4 to the user terminal 5 via wireless communication requiring proximity between the device 2 and the user terminal 5, for example via near-field communication (NFC), or via optical readout, by the user terminal 5, of a pattern representative of the identifiers and displayed by the device 2, the pattern being for example a barcode or a QR code.

In a step E6, the user terminal 5 transmits the identifier specific to the device 2 and the identifier specific to the vehicle 4 to the system 1.

In a step E7, the system 1 checks for the existence of a match, in the database, between the two identifiers transmitted by the control unit 3 of the vehicle 4 and stored in the database and, respectively, the identifiers transmitted by the user terminal 5 to the system 1 and received by the user terminal 5 from the device 2 in step E5.

In the case where the match exists, the system 1 transmits, in a step E8, the second secret associated with the pair of identifiers stored in the database to the user terminal 5.

Next, in a step E9, the first secret is transmitted by the system 1 to the control unit 3 of the vehicle 4.

The first secret may for example be the password checker and the second secret may be the pairing password. In the present case, the user terminal 5 transmits a candidate password to the control unit 3 of the vehicle 4 via near-field communication (NFC), the password checker thus authorizing the setup of the secure communication channel between the terminal 5 and the control unit 3 of the vehicle 4 provided that the candidate password transmitted by the user terminal 5 to the control unit 3 of the vehicle 4 matches the pairing password transmitted by the system 1 to the user terminal 5.

If the checker gives its authorization, the secure communication channel between the control unit 3 of the vehicle 4 and the user terminal 5 is set up in a step E10.

In a step E11, the user is invited, for example through receipt of a notification on their terminal 5, to pair their terminal 5 with the vehicle 4. For example, they may place their terminal 5 close to the internal reader 6 of the vehicle 4 in order to proceed with the pairing. Pairing is understood to mean a procedure for generating, sharing and storing cryptographic keys between the control unit 3 of the vehicle 4 and the user terminal 5, via the secure communication channel, in order to allow the user terminal 5 to be able to interact with the vehicle 4 (for example to allow the user terminal 5 to be able to control various components of a vehicle, and for example to open the doors or start the engine).

The user terminal 5 is paired with the vehicle 4.

The user may then interact with the various components of the vehicle 4 via near-field communication. For example, they may bring their user terminal 5 or their device 2 close to the handle in order to unlock the doors of the vehicle 4 and then, when they have entered the passenger compartment, they may place their terminal 5 in or close to the internal reader 6 of the vehicle 4 in order to start the engine.

In the case where the match does not exist between the identifiers, in the check carried out in step E7, the system 1 transmits, in a step E71, to the user terminal 5, an error message instead of the second secret, the error message indicating that the user terminal 5 is not authorized to communicate with the vehicle 4, or to initiate setup of a secure channel.

Figure 5:
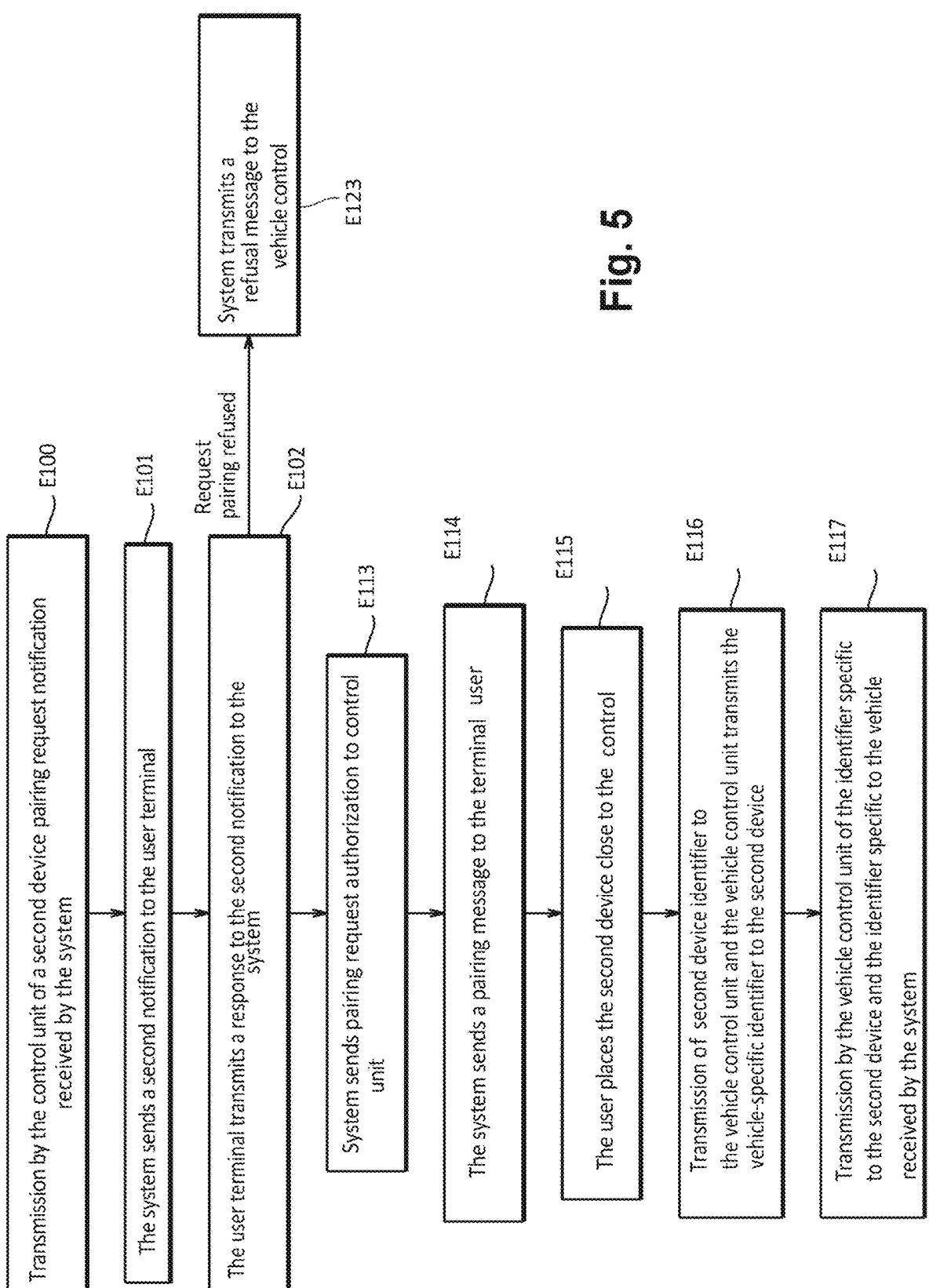
FIG. 5 is a flowchart illustrating additional steps to the flowchart from FIG. 4.

With reference to FIG. 5, the user may pair multiple devices with the vehicle 4.

In a step E100, the system 1 receives a notification, issued by the control unit 3 of the vehicle 4, informing the system 1 of a request for pairing between a second device 22 and the control unit 3 of the vehicle 4.

Upon receipt of the notification, the system 1 transmits, to the user terminal 5, a second notification inviting to accept the pairing request in a step E101.

In a step E102, the system 1 receives a response to the second notification from the user terminal 5.

The response may for example be a request transmitted by the user terminal indicating whether or not the pairing request is accepted.

In the case where the response indicates that the pairing request is accepted, the system 1 transmits, to the control unit 3 of the vehicle 4, authorization of the pairing request in a step E113.

The control unit 3 of the vehicle 4 is able to receive the specific identifier of the second device 22 transmitted by the second device 22.

In a step E114, the system 1 transmits, to the user terminal 5, a message telling the user to pair the second device 22. In one alternative embodiment, the control unit of the vehicle 4 displays a message for the attention of the user to tell them to pair the second device 22.

In a step E115, the user places the second device 22 close to the control unit 3 of the vehicle 4.

In a step E116, the identifier specific to the second device 22 is transmitted to the control unit 3 of the vehicle 4, in order to be stored there, and the control unit 3 of the vehicle 4 transmits the identifier specific to the vehicle 4 to the second device 22, in order to be stored there, via wireless communication requiring proximity between the second device 22 and the control unit 3, for example via near-field communication (NFC). In one alternative embodiment, the identifier specific to the second device 22 is transmitted via optical readout, by the control unit 3 of the vehicle 4, of a pattern representative of the first identifier and displayed by the second device 22, the pattern being for example a barcode or a QR code.

In a step E117, the control unit 3 of the vehicle 4 transmits, to the system 1, the specific identifier of the second device 22 and the identifier specific to the vehicle 4.

In the case where the response indicates that the pairing request is refused, the system 1 transmits, to the control unit 3 of the vehicle 4, a message refusing the pairing request in a step E123.

In this case, the second device 22 is not paired with the vehicle 4.

Figure 6:
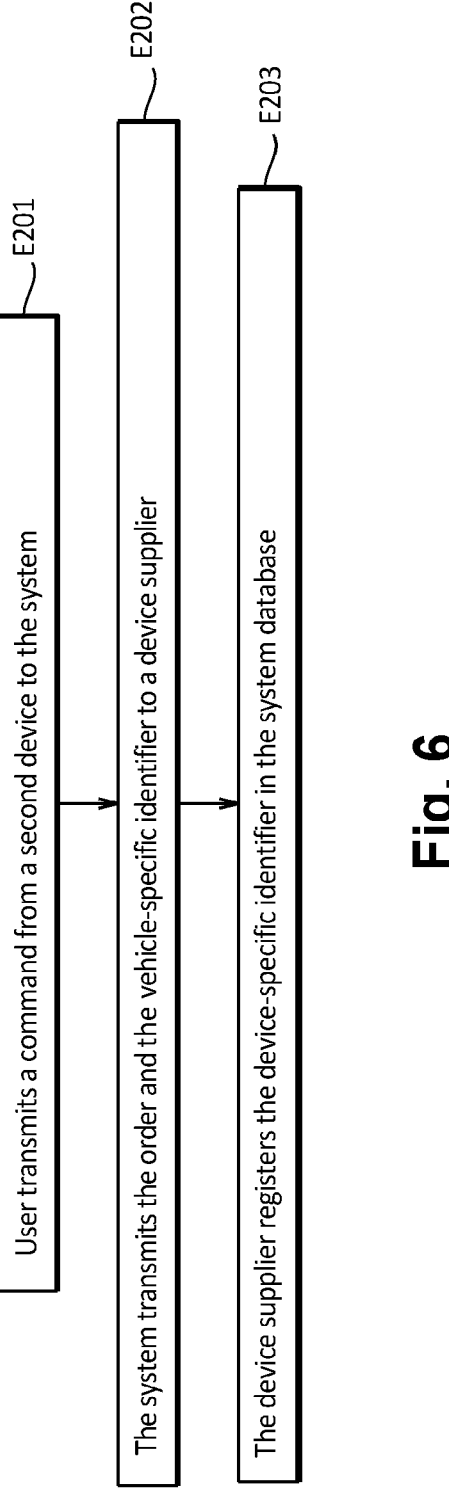
FIG. 6 is a flowchart illustrating other additional steps to the flowchart from FIG. 4.

With reference to FIG. 6, the user may also request a second device 22 directly from the manufacturer, according to the following steps.

In a step E201, the system 1 receives an order for a second device 22 distinct from the device 2 from the user.

In a step E202, the system 1 transmits the order and optionally the identifier specific to the vehicle to a device provider.

For example, the order may be transmitted in the form of a request by the system 1.

The second device 22 storing its specific device 22 identifier and/or displaying a pattern of its specific device 22 identifier is thus shipped by the device provider to the user. Optionally, the shipped device 22 also stores the identifier specific to the vehicle 4 and/or displays a pattern of the identifier specific to the vehicle 4. In one alternative embodiment, the pattern displayed by the second device 22 is representative of the specific identifier of the device 22 and of the identifier specific to the vehicle 4 in the form for example of a barcode or QR code.

Steps E100, E101, E102 and E113 to E117 may then be implemented by the user in order to pair the second device 22 with the vehicle 4.

In an optional step E203, the device provider records the identifier specific to the second device 22 in the database of the system 1.

Figure 7:
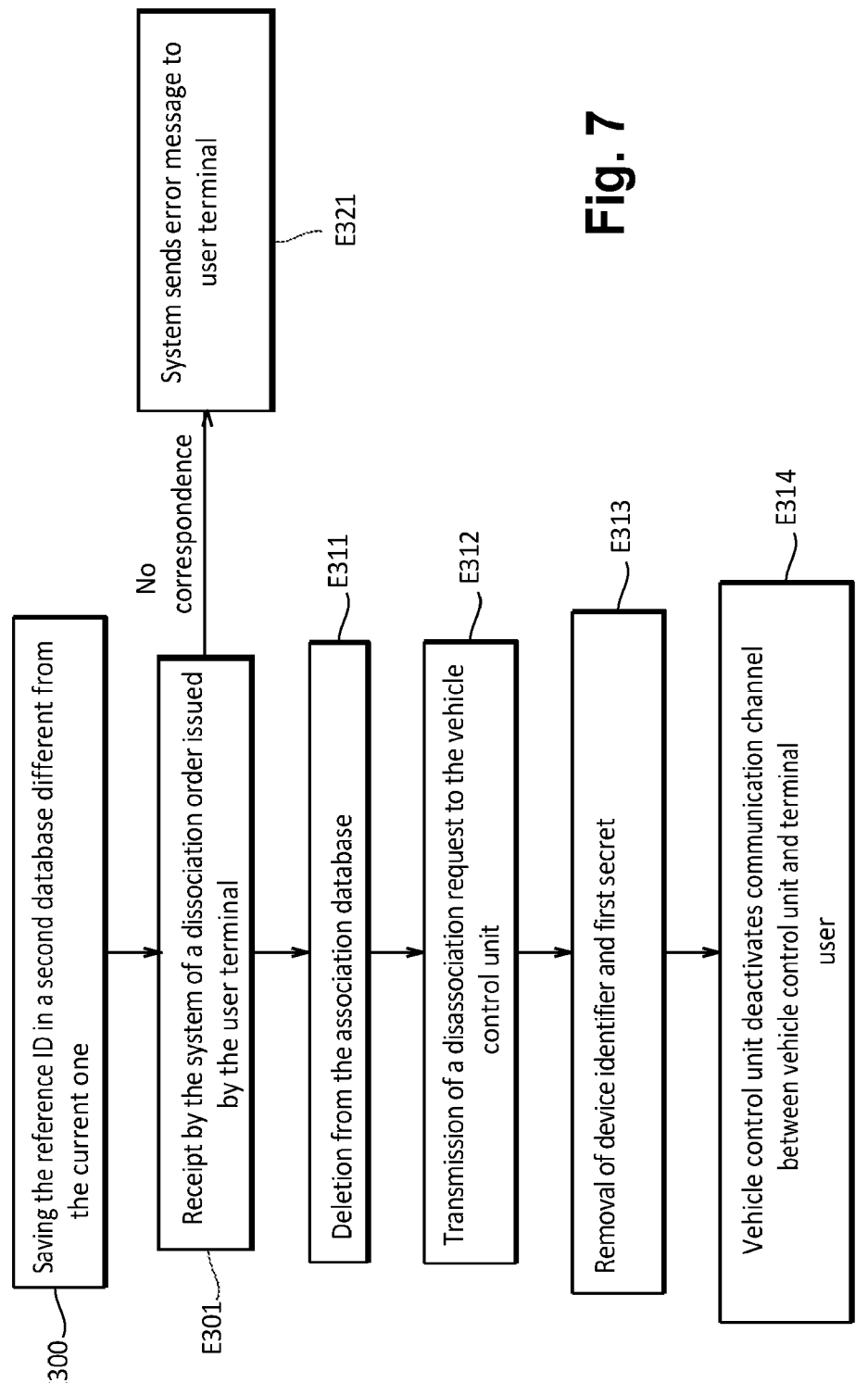
FIG. 7 is a flowchart illustrating other additional steps to the flowchart from FIG. 4.

With reference to FIG. 7, the user may delete the pairing of the user terminal 5 and/or the device 2 with the vehicle 4 according to the following steps.

In a step E301, the system 1 receives a dissociation order for dissociation between the first identifier and the second identifier, the dissociation order being issued by the user terminal 5.

For example, the order may be issued and transmitted by the user terminal 5, to the system 1, in the form of a request comprising at least one of the first identifier and the second identifier.

According to another mode of implementation, the order may be issued via the pushbutton 65 of the internal reader 6.

In the case where a match exists in the database between at least one of the two reference identifiers stored in the database of the system 1 and at least one of the first identifier and the second identifier received by the request, the match is deleted from the database in a step E311.

The system 1 then transmits, in a step E312, a disassociation request to the control unit 3 of the vehicle 4 to inform the control unit 3 of the vehicle 4 that said association has been deleted from the database and to command the control unit 3 of the vehicle 4 to disassociate the device 2 and/or the user terminal 5 from the control unit of the vehicle 4.

In a step E313, the control unit 3 of the vehicle 4 deletes the identifier specific to the device 2, such that said device 2 is no longer able to be recognized by said control unit 3 of the vehicle 4, and deletes the first secret.

In a step E314, the control unit deactivates the secure communication channel between said control unit 3 of the vehicle 4 and the user terminal 5.

The control unit 3 of the vehicle 4 thus no longer processes commands, for example requests, emanating from the user terminal 5 and/or from the device 2.

The deletion may be preceded by a step E300 in which the reference identifier corresponding to the first identifier is saved in a second database different from the database.

In the case where the match does not exist in the database between at least one of the two reference identifiers stored in the database of the system 1 and at least one of the first identifier and the second identifier received by the dissociation request, then the system 1 transmits an error message to the user terminal 5 in a step E321. For example, the error message may invite the user to contact a technical support team for the vehicle 4 or the device 2.

The invention claimed is:

1. A pairing initialization method comprising:
receiving, by a system, a first identifier and a second identifier transmitted by a user terminal, the first identifier being specific to a vehicle and the second identifier being specific to a device, the first identifier and the second identifier having been transmitted beforehand to the user terminal by the device via wireless communication requiring proximity between the user terminal and the device,
checking, by the system, for the existence, in a database, of a match between two reference identifiers stored in the database, corresponding respectively to the first identifier and to the second identifier,
provided that said match exists in the database between two reference identifiers stored in the database, corresponding respectively to the first identifier and to the second identifier, the system transmits:
a pairing password to the user terminal,
a checker to a control unit of the vehicle, the checker being configured to authorize setup of a secure communication channel between the user terminal and the control unit of the vehicle provided that a candidate password transmitted by the user terminal to the control unit of the vehicle corresponds to said transmitted pairing password.

2. The method according to claim 1, further comprising:
receiving, by the system, the two reference identifiers, the two reference identifiers being transmitted by the control unit of the vehicle,
storing the two reference identifiers in the database after they have been received.

3. The method according to claim 1, further comprising:
receiving, by the system, a dissociation order for dissociation between the first identifier and the second identifier, the dissociation order being issued by the user terminal and comprising at least one of the first and the second identifier;
provided that a second match exists in the database between at least one of the two reference identifiers stored in the database of the system and at least one of the first identifier and the second identifier contained in the dissociation order, deleting the second match from the database; and
transmitting, by the system, a dissociation request to the control unit of the vehicle, the dissociation request being configured to inform the control unit of the vehicle that the second match has been deleted from the database and to command the control unit of the vehicle to disassociate the device and/or the user terminal from the control unit of the vehicle, the control unit being configured, after receiving the disassociation request from the system, to not process commands emanating from the device and/or the user terminal.

4. The method according to claim 3, further comprising:
saving the reference identifier corresponding to the first identifier in a second database different from the database before the second match is deleted from the database.

5. The method according to claim 1, further comprising:
receiving, by the system, an order for a second device distinct from the device;
transmitting, by the system, the order to a device provider.

6. The method according to claim 1, further comprising:
receiving, by the system, a notification issued by the control unit of the vehicle, the notification informing the system about a request for pairing between a second device and the control unit of the vehicle, the second device being distinct from the device;
upon receipt of said notification, transmitting, by the system, an invitation to accept the pairing request to the user terminal;
receiving, by the system, a response to the invitation, the response indicating whether or not the pairing request is accepted; and
transmitting, by the system and to the control unit of the vehicle, authorization or refusal of the pairing request on the basis of said response.

7. The method according to claim 1, wherein transmitting the first identifier and the second identifier to the user terminal comprises:
near-field communication, or
optical readout, by the user terminal, of a pattern representative of the first and the second identifier and displayed by the device, the pattern being for example a barcode or a QR code.

8. The method according to claim 1, wherein the device is a chip card.

9. A system comprising:

a first communication interface configured to receive a first identifier and a second identifier transmitted by a user terminal, the first identifier being specific to a vehicle and the second identifier being specific to a device, the first identifier and the second identifier having been transmitted beforehand to the user terminal by the device via wireless communication requiring proximity between the terminal and the device, processing circuitry configured to check for the existence, in a database, of a match between two reference identifiers stored in the database, corresponding respectively to the first identifier and to the second identifier; and a second communication interface configured to transmit:

a pairing password to the user terminal, a checker to a control unit of the vehicle, provided that said match exists in the database between two reference identifiers stored in the database, corresponding respectively to the first identifier and to the second identifier, the checker being configured to authorize setup of a secure communication channel between the terminal and the control unit of the vehicle provided that a candidate password transmitted by the user terminal to the control unit of the vehicle corresponds to the transmitted pairing password.

10. A non-transitory computer program product comprising program code instructions for commanding the execution of the steps of the method according to claim 1 when the first code instructions are executed by a system.

\*   \*   \*   \*   \*